Nov. 18, 1969  V. MET  3,478,608
ALIGNING AND MOUNTING MECHANISM DEVICE
Filed June 23, 1966  2 Sheets-Sheet 1
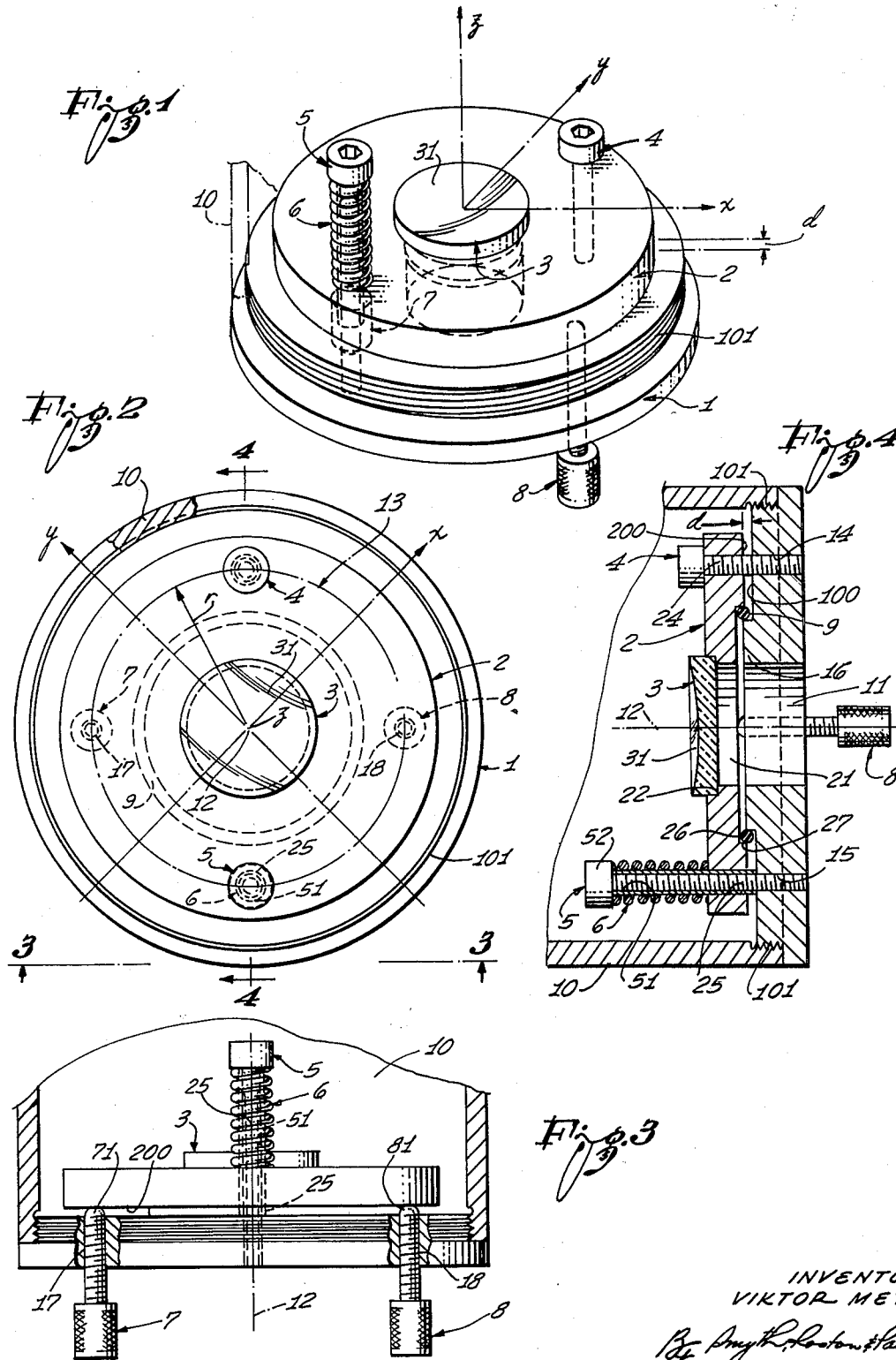
INVENTOR:
VIKTOR MET
ATTORNEYS

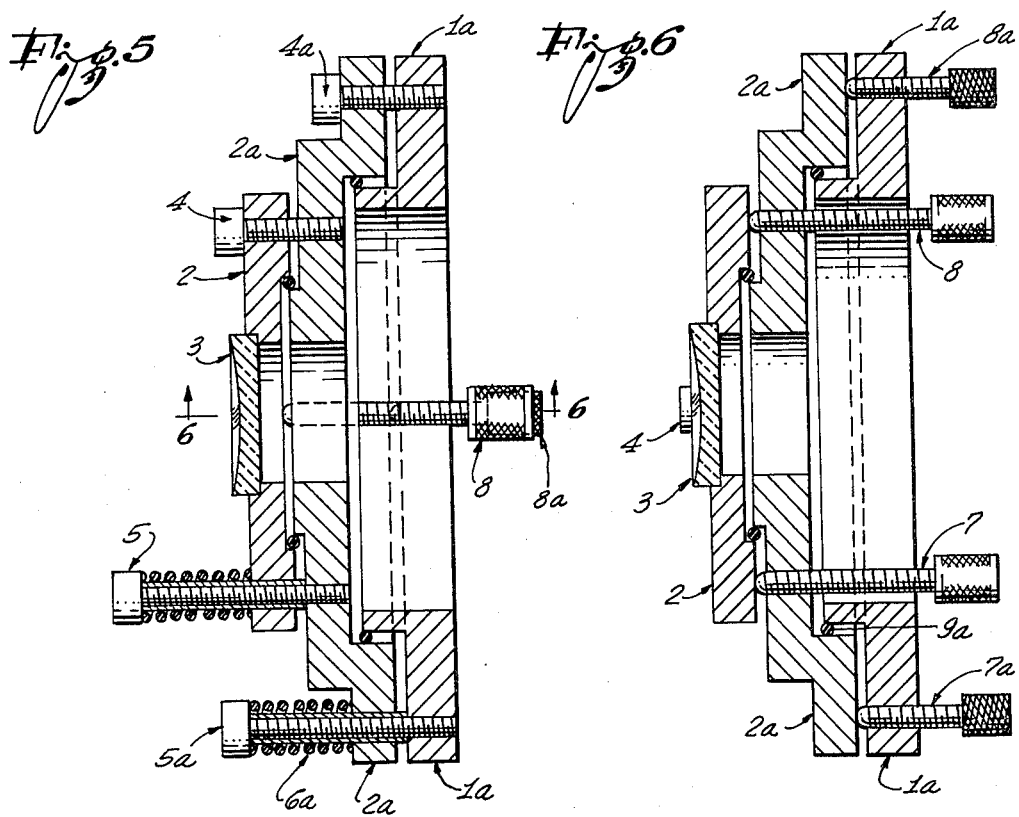

United States Patent Office 3,478,608
Patented Nov. 18, 1969

3,478,608
ALIGNING AND MOUNTING MECHANISM DEVICE
Viktor Met, Palo Alto, Calif., assignor to Electro Optics Associates, Palo Alto, Calif., a corporation of California
Filed June 23, 1966, Ser. No. 559,844
Int. Cl. F16h 29/20
U.S. Cl. 74—89.15                                         8 Claims

ABSTRACT OF THE DISCLOSURE

Arrangements are described to obtain non-interacting x-y alignment for optical reflectors, of a resolution adequate for use in laser cavities. At the same time, specific configurations are described that represent the reduction to practice of this concept, while at the same time offering other concepts such as that of a completely adjustable, quick-interchange mount, as well as that of a micrometer driven vernier drive, to be operated independently or in combination with such a quick-interchange mount.

---

The present invention relates to an aligning and mounting mechanism and device with the aid of which the angular relationship between two parts can readily and easily be adjusted.

The specific problem solved with the present invention arose in relation to the mounting of optical elements on an adjustable, quick interchange mount to be operated for adjustment independently from the interchangeability of the mount. The solution to the problem, however, finds utility for the mounting of elements other than optical, though the mounting of a reflector is the preferred field of employment.

In laser cavities as well as in other optical apparatus reflecting systems it is required that a reflector is mounted so that it can be adjusted angularly with respect to two normal axes in a non-interacting manner; the two axes define a plane which extends at right angles to the optical axis of the reflector proper. The mount with adjustment for such a reflector should be simple and compact, from standpoint of both, ease of manufacture and final use as a quick-interchange type mount.

The invention uses basically two mounting elements, such as flat plates, rings, etc., to one of which the element to be adjusted (such as a reflector) will be affixed; the other one of two mounting elements will be mounted to the remaining equipment in relation to which the adjustment is to occur. For example, in case of a laser there will be a tube defining the laser cavity and a reflector must be mounted to the tube. Thus, the first one of the two mounting elements bears the reflector, and the second one is mounted to the laser tube by way of a thread, bayonet lock or any other type of lock such as is used for interchangeable lenses on commercial cameras. The two mounting elements are now positioned in relation to each other by a plurality of elements arranged to define a bolt circle. The bolt circle can be defined in relation to either mounting element. There is first a torsion bar interconnecting the two mounting elements to establish a particular distance between them. Means are provided to urge the two mounting elements towards each other, at a point on the bolt circle diametrically opposite to the torsion bar; the urging means may be a compression spring and there may be provided a guide pin received by the spring. The guide pin is secured to one of the mounting elements, and a registering opening in the other mounting element clearingly receives the guide pin.

At 90° displacement on the bolt circle with reference to both torsion bar and guide pin there are two adjusting screws located in diametrically opposite relationship, threadedly received by one of the mounting elements and bearing with their tips against the other mounting element, whereby the spring ensures positive engagement between tips and the other mounting element. As each adjusting screw can be adjusted individually, the mounting elements can be tilted in relation to each other with respect to two normal axes with very little interaction as between the tilting about either of the two axes. This way, the first mounting element, for example, carrying a reflector can be tilted about any resultant axis intersecting its center axis at right angles, provided, the above defined bolt circle is concentric with the said center axis. Additional means may be provided to ensure a centered position of the two mounting elements relative to each other.

While the specification concludes with claims particularly pointing out and distinctly claiming the subject matter which is regarded as the invention, it is believed that the invention, the objects and features of the invention and further objects, features, and advantages thereof will be better understood from the following description taken in connection with the accompanying drawing, in which:

FIGURE 1 illustrates in perspective view a preferred embodiment of a mounting and aligning device in accordance with the present invention;

FIGURE 2 illustrates a top elevation of the mounting device shown in FIGURE 1;

FIGURES 3 and 4 respectively illustrate sectional views taken along lines 3 and 4 of FIGURE 2; and FIGURES 5 and 6 illustrate sectional views taken from right angle section planes of cascaded mounting devices of the type illustrated in FIGURES 1 to 4 establish a vernier drive.

Proceeding now to the detailed description of the drawings, in FIGURES 1, 2, 3 and 4, thereof is shown an alignment and mounting device for a reflector 3 to be mounted at the end of, for example, a laser cavity principally defined by a tube 10. This mounting device comprises a mounting plate 1 which also serves as an end plate of the laser cavity. The mounting plate 1 is shaped to match the round end of the tube 10, and is threadedly received at 101 in the end portion of the tube 10. Mounting plate 1 is ring shaped in view of the particular purpose of the mounting device and the central opening 11 thus defined serves for the passage of light in the direction of an axis 12. This opening 11 is the laser beam exit. The reflector 3, usually being a semi-transparent mirror, is mounted to extend across the opening 11. The reflector 3 is not directly mounted to the ring 11 but through the arrangement to be described next.

The reflector plate 3 is mounted directly, i.e., it is for example, glued to a ring plate 2 also having an opening 21 which registers with the opening 11 and having a diameter smaller than the reflector plate 3 so that the latter can be seated on ring-shaped shoulder 22 as defined by the ring 2. Before discussing the structural details of plates 1 and 2, some general aspects should be considered.

The mirror 3 has, as shown, a concave reflecting surface 31. The particular shape of this reflecting surface is not of critical importance for the general aspect of the present invention. It is, however, important that the reflector be mounted in relation to a plane perpendicular to the axis 12. Within tolerances, this axis 12 is, for example, at least parallel to the tube 10 and/or perpendicular to plate 1 the position being defined, for example, by its surface plane 100. It is apparent, however, that at the other end of the laser there is another mirror to be mounted to the tube, and the optical relation between these two mirrors is very critical and should not depend on the accuracy with which the various parts are machined. One can, therefore, look at this problem from two points of view.

Assuming that axis 12 represents the optical axis in relation to which the particular mirror 3 is to be adjusted, because other optical elements have already defined that axis, then the increment of surface 31 traversed by axis 12 must be perpendicular to that axis 12, but very likely will not have that orientation within the desired degree of accuracy due to manufacturing tolerances of machined parts with the aid of which one could mount the mirror 3 directly to end ring or plate 1. For example, plane 100 is not precisely perpendicular to axis 12, and/ or, a direct mounting of mirror 3 to ring 1 would not produce the desired relationship with sufficient accuracy.

The other point is view is, that one regards axis 12 as being defined to be an axis normal to plane 100 and a mirror mounted to plate 1 would be properly oriented to that axis; however, such a mount would not necessarily provide the proper orientation to other, cooperating optical elements. Thus, the two points of view differ in that any additional adjustment of reflector 3 would, from the first view point tend to adjust towards a perpendicular relationship to axis 12, from the second view point the adjustment would occur out of the axis 12.

This distinction is being made here as it will be more convenient to use one view point for describing the invention, but it is understood that this is no restriction. Therefore, I choose to consider axis 12 as being established by the illustrated device, i.e., it is an axis defined by the plate 1 and precisely perpendicular to plane 100, thereof, and it is probable that this plane 100 of the part 1 when mounted to tube 10 does not define the desired orientation for the mirror 3 with the required degree of accuracy. Thus, mirror 3 must be mounted to plate 1 (and thereby to the rest of the equipment) which permits tilting of the mirror about an axis normal to the optical axis Z of the mirror 3, but having otherwise an unknown orientation. That tilting can be produced by establishing two normal axes of known orientation and both being normal to the axis Z. These two axes are illustrated and denoted X and Y. Thus, the coordinate system X-Y-Z is referenced against the mirror. Tilting of the mirror 3 means tilting about any axis in the X-Y plane as it exists at any instant. This tilting axis is initially unknown, and thus not "built into" the equipment; it is the variable factor which establishes the requirement for having the adjusting system to begin with. Any tilting of mirror 3 is thus to be the resultant of two independent tilting operations about the two axes X-Y normal to each other and normal to the optical axis Z of the mirror, whereby the two tilting steps must be mutually independent or non-interacting to produce a true resultant about an axis oblique to the axes X and Y. The particular orientation of axes X and Y relative to the mirror 3 is basically arbitrary, but of course, once an axis, for example X, has been placed, then the orientation of the other, Y, follows by necessity. The inventive system as described, now suggests very simple means to provide two axes of tilting, which approximate an orthogonal X-Y system of ideal tilting axes with a high degree of accuracy. With this we proceed to the description of the means with which ring plate 2 bearing mirror 3 is mounted to ring plate 1. The ring plate 1 is provided with four cylindrical openings 14, 15, 17 and 18, and the center axis of each of these openings is parallel to axis 12, and they are all spaced from this axis by a distance $r$ to thereby define a bolt circle 13 on plane 100. The center axis of these four openings are, furthermore, positioned in a 90° spaced relationship on that circle 13.

The first opening to be described and denoted with reference numeral 14 receives the end of a torsion bar 4 which is fixedly connected not only to plate 1 but also to plate 2. Specifically, the surface of plate 2 facing plate 1 defines a plane 200, and torsion bar 4 defines the distance of plane 100 from plane 200 in the region of the torsion bar. This torsion bar 4 is thus received in an opening 24 in plate 2 registering with the opening 14. The torsion bar may be made of steel or synthetic material such as is traded under the name of "nylon," i.e., it has elastic properties to permit variation of the plane of predominant extension of ring plate 2 to that of ring plate 1, both as far as angle as well as direction of the angle of inclination are concerned.

The torsion bar 4 may be a screw which is threadedly received in both openings 14 and 24 but alternatively the connection may be provided as a fixed joint, weld, etc. It is the principal objective of the device that the torsion bar 4 initially defines the distance $d$ between the two plates 1 and 2 which at that area of the torsion bar is not being varied throughout the mounting and adjusting procedure. As far as the invention is concerned the interconnection between the plates 1 and 2 by means of the torsion bar 4 is a fixed and invariable one but, of course, initially that distance may be adjusted as it is important that this distance $d$ be very accurately determined.

The diametrically oppositely positioned opening 15 in the plate 1 receives the end of a guide pin 5 which is also loosely slide fitted in an opening 25 of plate 2. The opening 15 in plate 1 may be threaded and pin 5 may thus be a threaded bolt. A sleeve 51 covers the thread of the bolt or pin 5 in the area outside of opening 15 and thus must slide fit between pin 5 and the walls defining the opening 25. The guide pin 5 as well as the sleeve 51 may be made of steel. Pin 5 can be operated as adjustment screw to define the position of its head 52 in relation to plate 1. Opening 25 clears guide pin 5, so that without further measures the distance of plate 1 from plate 2 in the region of the guide pin is open to further change.

As it can be seen, by means of the torsion bar 4 and the guide pin 5 the relative positions of thhe two plates 1 and 2 are now defined. Depending upon the tolerances and the accuracy of machining, the distance between the two plates 1 and 2 is defined by distance $d$ which is established by the torsion bar 4. Depending upon the accuracy of the mounting of plate 2 to plate 1 by means of the torsion bar 4, plate 2 will be more or less parallel to plate 1, i.e., planes 100 and 200 will substantially be coplanar; this is not too critical. In principle, however, the tension of torsion bar 4 by operation of the adjustment to be described below, should not be too large to prevent fatiguing. It is thus advisable that torsion bar 4 establishes rather accurately a coplanar relation between plates 1 and 2, without tension.

The pin 5, as positioned prevents rotary motion of the plate 2 relative to the plate 1 around the axis of torsion bar 4. The degree with which this rotary motion is prevented depends on the tolerance with which pin 5 and sleeve 51 fit into aperture 25. It will become apparent more fully below that this tolerance determines the range of adjustment of the system. To the extent that tolerance is necessary it permits a restricted pivot motion of plate 2 about the axis of torsion bar 4.

A coil spring 6 is provided to urge the plate 2 towards plate 1. Spring 6 is biased for compression and extends between the head 52 of the guide bolt 5 and one surface of the plate 2 thereby urging the plate 2 in the direction towards plate 1 tending to diminish the distance between the plates 1 and 2 in the region of the guide pin 5. Thus without further measures this spring 6 would tend to tilt or pivot the plate 2 relative to the plate 1 around an axis which extends traversely to the axis of the torsion bar 4, and such a pivoting would occur in the plane as defined by FIGURE 4, or in a plane perpendicularly to FIGURE 3 of the drawing, running through the axis 12.

Spring 6 is chosen to easily overcome the elastic force offered by the torsion bar 4, so that without further measures spring 6 would urge plate 2 into direct engagement with plate 1, unless the tolerance of bore 25 is so small, that the bolt 5 prevents the two plates from engaging.

Specifically this depends on the relationship between the distance $d$ and the tolerance between elements 5, 51 and 25. Such a pivot motion is impeded further by two alignment screws 7 and 8 respectively received in the openings 17 and 18 in plate 1. The center axis of each of these openings 17 and 18 are positioned on the bolt circle 13 as defined above.

It follows now that the elements 4, 5, 7 and 8 are all positioned on the bolt circle 13. The axes of the elements 4, 5, 7 and 6 are spaced 90° in respect to each adjacent one on the 360° circumference of the bolt circle 13. From a different point of view, the respective axes of pin 5 and of torsion bar 4 define a plane running through the axis 12, and the adjusting screws are positioned in mirror-image symmetry to that plane, which is the plane of the drawing of FIGURE 4. It appears that this plane was defined by three parallel axes, but only two parallel axes are required to define a plane. Thus the position of these three axes in relation to each other (bolt 4, pin 5, axis 12) again becomes a matter of machining tolerances.

It should be mentioned further that the axis of pin 5 has an additional significance here; it defines the particular direction of the force of spring 6 in relation to ring plate 1, urging the plate 2 towards plate 1, and it is that particular direction of force rather than the mere geometry of the pin 5 which is the controlling aspect. The geometry of the pin in relation to the concentric aperture 25 defines the effective direction of the force, and this direction must be located in the plane defined by axis 12 and by the axis of torsion bar 4, and with a high degree of accuracy.

Alignment screws 7 and 8 have well defined, pointed or calotte shaped tips 71 and 81 respectively bearing against the plate 2. The screws 7 and 8 are, of course, threadedly received by the openings 17 and 18, and they resemble micrometer spindles. It is important that the rounded or pointed tips 71 and 81 of the two screws 7 and 8 engage the plate 2 at points which have mirror-image symmetry to the above-defined plane established by axis 12 and by elements 4 and 5. These points can be defined in the alternative in the following manner. Screws 7 and 8 may have flat ends and two bores are provided in plate 2 to receive balls engaging respectively the flat screw ends. The point where the axis of torsion bar 4 intercepts plane 200, together with the two points of engagement of the ends of screws 7 and 8 with the plane 200, define two lines which are at right angles to each other.

To the extent that the adjusting screws 7 and 8 project from the openings 17 and 18, they impede the above-defined tilting motion of plate 2 towards plate 1 tending to curb the expansion of spring 6. Therefore, if the tips of the two adjusting screws 7 and 8 each project with their respective tips from plane 100 by the distance $d$ then the plates 2 and 1 will in fact extend precisely coplanar. As stated above, it is desirable that torsion bar 4 is without tension for this position of plate 2 relative to plate 1.

Three points define always a plane and such three points are established now by the elements 4, 7 and 8 on plane 200, each point having a distance $d$ from the plane 100 defined by the surface of ring 1. This now establishes a coplanar relation between reflector 3 and mount plate 1 which, as far as angular relationship is concerned is equivalent to a mounting of reflector 3 directly to ring 1 and can thus be regarded as a starting point for an adjustment.

If the ring 1 were machined for very accurate right angle positioning of its plane 100 relative to tube 10 defining the laser cavity, then the aforedescribed position of reflector 3 on ring 2 were defined in relation to the tube 10. For zero tolerances of all machined parts that would suffice. On the other hand, the various tolerances of the system, and particularly of the position of a reflector at the other end of the laser cavity all may add up, so that it is necessary to change the angular position of the reflector 3 and to establish very accurately the particular relationship thereof to the reflector at the other end of laser 2.

The adjustment may require the reflector 3 to be tilted about an axis which is basically unknown, except that it is located in a plane normal to the optical axis Z of the reflector 3. The adjusting system as described establishes now to substantially orthogonal tilting axes permitting individual, substantial non-interacting tilting about either of them to define a common tilting axis in the plane expanded by the two tilting axes. That these two tilting axes at least approximate an ideal X–Y system as defined above will be described next. Therefore, the actual tilting of the reflector 3 will be required to produce a tilting around the axes X and Y, to produce a resulting tilting angle about a resulting axis which meets the specific requirement of adjustment.

Plate 2 is now tilted relative to plate 1 by turning the screws 7 and 8. In particular, tilting about a first axis is carried out by turning screw 8, while the screw 7 remains fixed. The spring 6 continues to cause the plate 2 to remain in engagement with the two tips 71 and 81. Thus the distance $d$ remains constant as between the plates 1 and 2 along a line defined by the center of the torsion bar 4 and the point where the tip 71 engages the plate 2. Upon adjusting, plates 1 and 2 thus tilt relative to each other about that line. This latter line is parallel to the axis X. If one references the tilting against the center of the reflector 3, it follows that the reflector tilts around the axis X, coupled with an axial displacement of the center of reflector 3 relative to plate 1 along axis 12.

The adjustment screw 8 may be turned either way to increase or diminish the distance of plate 2 from plate 1 at the region of action of screw 8. Thus reflector 3 may tilt about axis X in either direction; one can cause the screw 8 to ultimately project by a distance larger than $d$ from plate 1 or by a distance smaller than the distance $d$. After screw 8 has been adjusted the optical axis Z has an oblique angle against the axis 12, and of course the axis Y has now a like angle relative to plane 100. Thus, the previously changed position of adjusting screw 8 has thereby established a new pivot axis as between it and the torsion bar 4, which is substantially parallel to the desired, ideal axis Y having now an oblique position substantially parallel to the line defined by the interception of the axis of bar 4 with plane 200 and tip 81.

Upon turning now screw 7 while retaining the previously adjusted position of screw 8 plate 2 tilts around a pivot axis as defined between torsion bar 4 and screw 8, and again this is equivalent to a translatory motion of the center of the mirror 3 relative to plate 1 in direction of axis 12 coupled with a pivot motion about axis Y. This pivoting of the two plates 1 and 2 relative to each other when referenced against the center of the reflector 3 is substantially a true tilting about any axis normal to the optical axis of the reflector at the point of its intersection with the reflector surface.

The principal point of the arrangement is that in a very simple manner plate 2 can be pivoted relative to plate 1 about two well defined orthogonal axes, the tilting to occur non-interacting to the extent of ideal point contact realization at locations 4, 5, 7 and 8 and to the extent of small tolerances realized between the guide bolt 5 and the aperture 25. However, the larger an adjustment range is required, the larger is the clearance that is required between pin 5 in opening 25 to prevent binding.

It can thus be seen that for the desired elimination of X–Y interaction the "weak link in the chain" here is the pin 5 and the aperture 25. To permit the establishing of a sufficiently large adjusting range of plate tilting the clearance cannot be too small, and it is thus inadvisable to rely on pin 5 alone for the centering of the two plates 1 and 2. On the other hand, pivoting of plate 2 relative to plate 1 about the axis of torsion bar 4 inevitably produces an X–Y interaction, unless parts 1 and 2 are additionally centered.

As can be seen further specifically from FIGURE 4, the plate 1 is additionaly provided with a tubular extension 16 having axis 12 also as its center axis, and the ring 2 is provided with a ring shaped ledge 26 thereby defining a radially oriented cylindrical surface 27. A centering ring 9 made of rubber or any other suitable resilient material is positioned between the tubular portion 16 and the surface 27 and thereby centers the ring 2 additionally or even predominantly in relation to ring 1. The centering of elements 2 and 1 with respect to each other is the better the tighter the resilient O-ring 9 is fitted. Additionally, this O-ring 9 provides a dust seal of the interior of the laser cavity with respect to the exterior.

FIGURES 5 and 6 illustrate how two devices of the type as aforedescribed can be cascaded, in that the part which was plate 1 in FIGURES 1 to 4 now is designed to perform additionally the function of a plate to be tilted, bearing therefore number 2a. The ring 1b is the principal mounting device in relation to which all adjustments occur. There is accordingly, a second set of adjusting screws 7a and 8a, a second torsion bar 4a and a second pin (5a)—spring (6a) arrangement. A second center ring 9a centers part 2a in relation to ring 1a. The elements 4a, 5a, 7a and 8a are arranged on a common bolt circle. The positions of elements 4, 5, 7 and 8 together in relation to elements 4a, 5a, 7a and 8a, also taken together, are shown in a corresponding relationship so that any tilting is produced in relation to the same pair of axes X-Y. This, however, is not essential for practicing the invention; as complete independence of the two adjusting systems may be postulated, a random arrangement of the element group 4a, 5a, 7a and 8a can be permitted as far as angular orientation is concerned, of course, both groups are coaxially arranged, if true cascading is desired. As the bolt circle of elements 4a, 5a, 7a and 8a is larger than the other bolt circle, any adjustment by means of screws 7a and 8a is finer than an adjustment by means of screws 7 and 8. This can be enhanced by selecting a finer pitch for screws 7a and 8a than for screws 7 and 8.

The invention is not limited to the embodiments described above, but all changes and modifications thereof not constituting departures from the spirit and scope of the invention are intended to be covered by the following claims:

1. A device for mounting a first plate in an accurately adjustable angular relationship to a second plate, comprising:
   a bar interconnecting the first and the second plate to provide a particular, fixed distance as between the two plates in the region of extension of the bar;
   first means operatively coupled to one of said first and second plates at a particular distance from the bar to urge the first and second plates towards each other; and
   second and third spacing adjusting means positioned in mirror image symmetry in relation to a plane extending transversely to said first plate, the plane running through the center of the bar and the center of urging action of the first means in relation to the first and second plates, the second and third space adjusting means being mounted to one of the first and second plates to engage the respective other one of the first and second plates to engage the respective other one of the first and second plates to respectively individually adjust the distances of the first plate from the second plate and the respective points of engagement of the second and third means with said other plate, the engagement of each of the second and third means with said other plate being positively enforced by the first means, and, within a range, independently from the spacing as individually provided by the second and third means between the first and second plates.

2. A mounting arrangement comprising:
   a first and a second device, each device including a first plate and a second plate, each device further including a bar interconnecting the first and the second plate to provide a particular, fixed distance as between the two plates in the region of extension of the bar, each device further including;
   first means operatively coupled to one of said first and second plates of the respective device at a particular distance from the bar to urge the first and second plates towards each other; and
   second and third spacing adjusting means on each of the devices, positioned in mirror image symmetry in relation to a plane extending transversely to said first plate of the respective device, the plane running through the center of the bar and the center of urging action of the first means in relation to the first and second plates of the respective device, the second and third space adjusting means of the respective device being mounted to one of the first and second plates to engage the respective other one of the first and second plates to respectively individually adjust the distances of the first plate from the second plate and the respective points of engagement of the second and third means with said other plate, the engagement of each of the second and third means with said other plate being positively enforced by the first means, and, within a range, independently from the spacing as individually provided by the second and third means between the first and second plates;
   the first plate of the first device being integral with the second plate of the second device, and the bar, and first, second and third means of the first device are concentrically arranged in relation to the bar and first, second and third means of the second device.

3. A mounting device as set forth in claim 1 comprising a pin fixedly mounted to said one plate, the second plate having an aperture through which the pin projects in clearing relationship, the pin having a head; and a compression spring interposed between the head and the second plate to urge the second plate towards the first plate.

4. A mounting device as set forth in claim 1, said second plate being disk shaped having circumferentially disposed means, known per se, for exchangeably mounting the second plate to equipment in relation to which the first plate is to be adjusted.

5. A device for mounting and aligning an optical element, comprising:
   a first ring having two diametrically opposed openings;
   a second ring for supporting a reflector;
   an elastic centering ring for seating the second ring on the first ring in a concentrical relationship, said two openings being symmetrically positioned to the center of said centering ring;
   a pair of adjusting screws respectively received by said openings and bearing against the second ring;
   a bar for fixedly interconnecting the first and the second rings; and
   means for urging the two rings towards each other at a location located oppositely to said bar, said bar, said urging means and said pair of adjusting screws being positioned on a common bolt circle concentrical to said centering ring.

6. A device for aligning and mounting a reflector to other optical equipment, comprising:
   a first support plate for mounting to the optical equipment in relation to which the reflector is to be mounted and aligned;
   a second plate having the reflector mounted to it;
   a bar for mounting the second plate to the first plate to establish a particular distance between the first and second plate in the region of the bar;
   means effective at particular distance from said bar to provide a force urging the second plate towards the first plate; and two spacing adjusting means effective in regions as between the first and second plates for independently changing the space between the first and the second plates at their respective regions of effectiveness in opposition to said force, a first one of the two space adjusting means, the force providing means, the second one of the two adjusting means and said torsion bar being located on a circle and in that succession at 90° distance in respect to each adjacent one.

7. A device for mounting a first plate in an accurately adjustable angular relationship to a second plate, comprising:

a bar interconnecting the first and the second plate to provide a predetermined distance as between the two plates where interconnected by the bar;

an opening in said first plate at a particular distance from said bar;

a guide pin anchored to said second plate and received by said opening to substantially prevent rotary motion as between the two plates in a plane coplanar with at least one of said plates;

a spring for urging said first and second plates towards each other in the region of said pin;

there being a pair of openings in one of said first and second plates positioned in mirror image relationship to a plane of symmetry extending transversely to said one plate, the plane running through the center of the bar and the center of said pin; and a pair of adjusting screws threadedly received by said two openings respectively, and bearing against the respective other one of said first and second plates, said spring positively enforcing the engagement as between said adjusting screws and said other one of said first and second plates, independently from the individual adjustment of said adjusting screws which adjustment each is effective perpendicularly to the plane of extension of said one plate, for tilting said other plate in relation to said one plate.

8. A device for tiltably mounting an optical element, having an optical axis, the tilting to occur about an axis normal to the optical axis but having otherwise unknown extension, comprising:

first means for supporting the optical element defining a particular plane;

second means for establishing three point contact with said first means in said particular plane, the three points being equidistantly spaced from said optical axis, a first point defining a substantially fixed distance of that first point from a second plane, the other two points being located to have a 90° angle in relation to the first point and establishing individually variable distances from said second plane; and third means for mounting said second means in relation to said second plane for variable distance adjustment of said other two points in relation to said second plane.

References Cited
UNITED STATES PATENTS

| | | | |
|---|---|---|---|
| 3,357,268 | 12/1967 | Richter | 74—89.15 |
| 3,045,535 | 7/1962 | Jacquinot et al. | |
| 3,204,471 | 9/1965 | Rempel | 74—89.15 |

FRED C. MATTERN, Jr., Primary Examiner

F. D. SHOEMAKER, Assistant Examiner

U.S. Cl. X.R.

88—14; 331—94.5; 350—310